J. S. Detrick.

Lathe Chuck.

N° 80,928.    Patented Aug. 11, 1868.

Witnesses;

Inventor;
J. S. Detrick
per
Attorneys.

United States Patent Office.

J. S. DETRICK, OF SAN FRANCISCO, CALIFORNIA.

Letters Patent No. 80,928, dated August 11, 1868.

IMPROVEMENT IN LATHE-CHUCK.

*The Schedule referred to in these Letters Patent and making part of the same.*

TO ALL WHOM IT MAY CONCERN:

Be it known that I, J. S. DETRICK, of San Francisco, in the county of San Francisco, and State of California, have invented a new and improved Chuck; and I do hereby declare that the following is a full, clear, and exact description thereof, which will enable those skilled in the art to make and use the same, reference being had to the accompanying drawings, forming part of this specification.

This invention has for its object to provide a chuck, for use on lathes in machine-shops, and for other purposes, which shall enable the operator to move the centre of his work without removing the chuck from the lathe.

And it consists in attaching the chuck to a back plate, upon which it is made to slide with the work which it contains, as will be hereinafter described.

Similar letters of reference indicate corresponding parts.

The chuck is formed in the manner usual in making the simple dog-chuck.

The dogs are operated by screws, the ends of which pass through the periphery of the chuck, with collars, which prevent longitudinal motion in the screw, but allow the screw to turn freely, the nut for the screw being in the dog.

Figure 2:
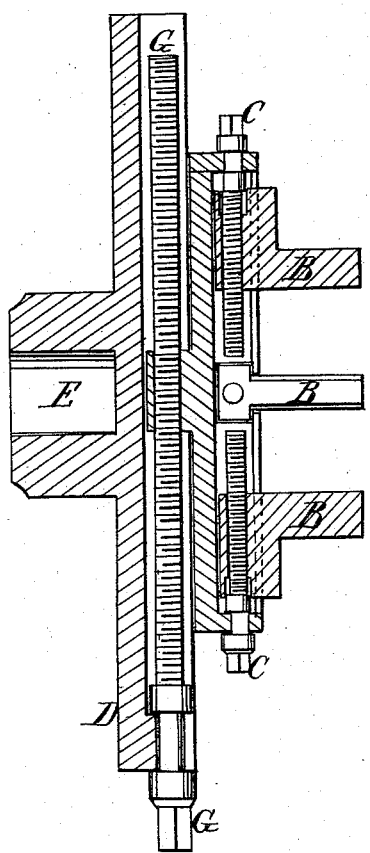
Figure 2 is a section of fig. 1, through the line $x$ $x$.
Figure 1:
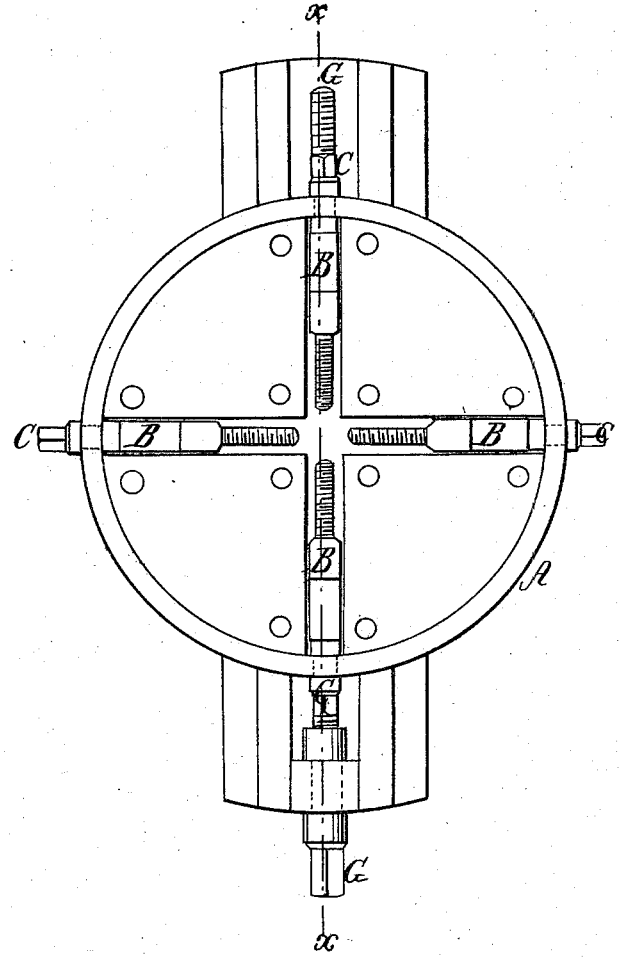
Figure 1 represents a front view of the chuck, attached to the back plate.

The dogs travel in grooves, which radiate from the centre of the plate, as seen in fig. 1, and they are held to their places by plates, which lap on to projecting flanges on each side.

The screws, by which they are adjusted and moved from or to the centre, pass directly through them, as seen in the drawing.

A is the chuck-plate.

B represents the dogs, between which the work to be bored, or turned, or held, is secured.

C represents the screws, by which the dogs are operated.

D is the back plate, to which the chuck is attached by a dove-tail sliding connection.

This plate has a hub, E, on its back side, which screws on to the mandrel of the lathe.

The dove-tail on the inner side of this plate (which receives a corresponding dove-tail on the back of the chuck) is hollow, so as to receive the screw G, by which the chuck is operated, and also a lug on the back of the chuck-plate, through which the screw passes, so that, by turning this screw, the chuck is moved on the plate D (in a direction parallel with the screw) either way from the centre.

The arrangement is the same as for moving the dogs, there being collars on the wrench-end of the screw, to prevent longitudinal motion.

G is the screw by which the chuck is moved on the plate D.

It will thus be seen that a piece of work may be securely fastened in the chuck, and moved from the centre for boring or turning, and which, for particular kinds of work, will cause a great saving of time, and be at once appreciated by all who are conversant in machine work.

The chuck will be found useful for wood, as well as for work in metals, and may be applied to either purpose with great advantage.

Having thus described my invention, I claim as new, and desire to secure by Letters Patent—

The back plate D, constructed as described, in combination with the sliding chuck and adjusting-screw C, all substantially as set forth.

The above specification of my invention signed by me, this thirtieth day of November, 1867.

J. S. DETRICK.

Witnesses:
 Jos. PERKINS,
 S. W. HOYT.